_3,459,632_
METHOD OF MAKING PAPER CONTAINING STARCH DERIVATIVES HAVING BOTH ANIONIC AND CATIONIC GROUPS, AND THE PRODUCT PRODUCED THEREBY
Carlyle G. Caldwell, North Plainfield, and Wadym Jarowenko and Irving D. Hodgkin, Plainfield, N.J., assignors to National Starch and Chemical Corporation, New York, N.Y., a corporation of Delaware
No Drawing. Filed Nov. 17, 1965, Ser. No. 508,363
Int. Cl. D21h 3/20; D21d 3/00
U.S. Cl. 162—175                           9 Claims

ABSTRACT OF THE DISCLOSURE

The use in manufacture of paper of novel additives comprising starch derivatives containing controlled proportions of cationic substituent groups as well as anionic phosphate groups. The resulting paper containing the latter additives is characterized by increased strength and improved retention of pigments.

---

Our invention relates to a method for making paper, and to the improved paper thus obtained. More specifically, it is our object to provide an additive which may be incorporated with the stock during the manufacture of paper, thereby causing the paper to be characterized by greater strength, improved retention of pigments, and other desirable properties.

Our invention comprises the addition to paper stock of novel starch products comprising amphoteric starch derivatives containing balanced and controlled proportions of cationic substituent groups as well as anionic phosphate groups.

As used herein, the term "paper" includes sheet-like masses and molded products made from fibrous cellulosic material, which may be derived from natural sources as well as from synthetics such as polyamides, polyesters and polyacrylic resins, as well as from mineral fibers such as asbestos and glass. Also included are papers made from combinations of cellulosic and synthetic materials. Paperboard is, of course, also included, within the broad term "paper."

It has been known to add various materials, including starch, to the pulp, or stock, during the papermaking process, prior to the formation of the sheet. The purpose of such additives has been mainly to bind the individual fibers to one another, thus aiding the formation of a stronger paper.

Furthermore, in the case of those papers which contain added pigments, such for example as titanium dioxide, it has been known to add materials to the pulp, or stock, for the specific purpose of retaining a greater proportion of such pigments in the paper (rather than have them drain off in the water that is removed during the formation of the sheet). Such additives are often referred to as "pigment retention agents."

One of the serious problems heretofore encountered in paper manufacture has been that additives employed for binding and strengthening the paper had insufficient effect in improving pigment retention, or in many cases actually decreased the amount of pigment retained by the paper. Similarly, those additives which were most effective as pigment retention agents had no effect in strengthening the ultimate paper sheet, or in some cases actually drastically weakened it.

The aminoalkyl starch ethers described in U.S. Patent No. 2,813,093 and employed in the papermaking process of U.S. Patent No. 2,935,436 have brought about improvements in both paper strength and pigment retention. However, the search for greater improvements has continued, with the particular objective of providing an additive that would be effective over a wide pH range, regardless of the hardness of the water which is employed in the pulp and in cooking the starch, or of the presence or absence of other additives such as alum.

It has been proposed to use starch phosphates as pigment retention agents, but their effectiveness has been far from satisfactory, and is believed to be limited to those pulps containing substantial amounts of alum. This is becausse starch phosphate, an anionic polyelectrolyte, is repelled by negatively charged pulp and pigment particles and can neither be retained in the pulp itself, to a sufficient extent, nor help retain the pigments, unless the electrostatic charges are changed by other additives, such for example as aluminum sulfate (so-called papermakers alum). Thus, starch phosphates, like other anionic starch derivatives such as starch sulfonates, various starch halfesters or ethers containing carboxyl groups, depend on the presence of alum for their effectiveness.

We have now discovered that the addition of a novel starch derivative, hereinafter described, to the pulp at any stage prior to the formation of the paper sheet, results in a remarkable improvement in pigment retention, together with a concomitant increase in paper strength. This improvement, particularly with regard to pigment retention, is greater than anything that could heretofore be achieved by the addition to paper pulps of corresponding amounts of other starch derivatives, or any combinations of such derivatives. Furthermore, our novel additive is effective over a wider range of pH conditions in the paper stock, as compared to previously used materials, with or without the presence of alum.

The novel additives used in our invention are starch derivatives containing cationic groups, together with a controlled amount of anionic phosphate groups.

As the cationic substituent in our starch additive, we prefer a tertiary or quaternary amine group. However, other cationic groups are operable, as for example primary and secondary amine groups, sulfonium and phosphonium groups. The preparation of aminoalkyl ethers of starch, wherein the starch derivative contains tertiary amine groups, is described in U.S. Patent No. 2,813,093. Similarly, sulfonium and phosphonium derivatives of starch are described in U.S. Patents Nos. 2,989,520 and 3,077,469 respectively.

It is known that quaternary amine groups may be introduced into the starch molecule either by suitable treatment of the tertiary aminoalkyl ether of starch, as described for example in U.S. 2,813,093, or quaternary groups may be introduced directly into the starch molecule, as for example by treatment with the reaction product of an epihalohydrin and a tertiary amine or tertiary amine salt.

Other suitable cationic starch derivatives will be apparent to the practioner, it being remembered that our process may employ any starch derivative which contains a cationic (i.e. electrically positively charged) moiety in the starch molecule.

As stated, the starch derivative, to be suitable as an additive to paper pulp in the process of our invention, must also contain a controlled amount of anionic phosphate groups. It should be mentioned that, for the purposes of our invention, the introduction of cationic groups and phosphate groups into the starch molecule may take place in any desired order.

The technique for phosphorylating a starch base is known to those skilled in the art. Thus, U.S. Patent Nos. 2,824,870, 2,884,412 and 2,961,440 disclose various phosphorylation techniques consisting, essentially, of heat reacting starch impregnated with a phosphate salt of an alkali metal, within a prescribed pH range. For the purpose of our invention, the phosphorylations are limited to reactions of starch with any phosphorylating agent yielding ortho-phosphate mono-ester groups, i.e. mono-starch phosphates. The di-starch esters are inhibited products (i.e., characterized by retarded gelatinization in water) and are not suitable because of their poor performance in our papermaking process. Thus, a representative method for carrying out a suitable phosphorylation would involve impregnating starch with dihydrogen sodium phosphate (in an amount of from 2% to 4% by weight of the dry starch), at pH 4–8, and preferably at pH 6.0, drying the starch, and heating at 120–130° C. for one to three hours.

We have found that in order to be most effective as an additive in the process of our invention, the selected starch derivative should have a ratio of anionic, i.e. phosphate, groups to cationic groups within the range of from about 0.01 to 4.5 moles of anionic groups per mole of cationic group, with the preferred range being from about 0.07 to 0.18 mole of anionic groups per mole of cationic group. Thus, starch derivatives which exhibit molar ratios in excess of about 4.5 moles of anionic groups per mole of cationic group do not show the synergistic effect which is desired in these cationic-anionic derivatives, since the usefulness of such products, in the wet-end addition procedure, has been found to be limited to a rather narrow pH range. On the other hand, starch derivatives which exhibit molar ratios below the minimum value of about 0.01 mole of anionic groups per mole of cationic group display little improvement over cationic derivatives which are entirely devoid of added phosphate groups. It should be noted that for purposes of brevity, the molar ratio of anionic to cationic groups will, hereinafter, be designated as the "$(A/C)$ ratio."

Furthermore, we have found that the starch derivatives suitable for use in the process of this invention should be substituted with cationic groups to such an extent that their degree of substitution (D.S.), i.e. the average number of cationic groups per anhydroglucose unit of the starch molecule, ranges from about 0.005 to 1.50. Thus, the optimum amount of phosphate groups required in any particular derivative may be readily determined by an inspection of its $(A/C)$ ratio and its concentration of cationic groups.

In addition, the phosphorylation procedure should be conducted under conditions which minimize any inhibition of the derivatized starch granules (i.e. "inhibition" referring to a markedly reduced ability to gelatinize, on the part of the starch granules). Inhibition of the starch derivative leads to poor dispersability in water, and this in turn results in poor pigment retention when the starch is used as an additive in the papermaking process.

The starch derivatives suitable for the process of this invention may be either in the form of intact granules or in the cold water soluble (e.g. pregelatinized) form. They may be derived from any plant source, including corn, rice, tapioca, sago, waxy maize, sorghum, potato, sweet potato, wheat, high amylose corn or the like. They may also be derived from any of the conversion products of these starch types, such for example as fluidity or thin-boiling starches prepared by enzyme conversion or mild acid hydrolysis. Also, cationic-anionic derivatives of the amylose or amylopectin fractions derived from starch may be utilized. It is also possible to employ, in our process, starch derivatives containing other substituent groups beside the required anionic and cationic groups, provided that the previously stated proportions of anionic and cationic groups are present.

The herein described starch derivatives are used mainly as beater additives, although their addition may occur at any point in the paper-making process prior to the ultimate conversion of the wet pulp into a dry web or sheet. Thus, for example, they may be added to the pulp while the latter is in the headbox, beater, hydropulper or stock chest.

The pigment retention and strength agents of our invention may, of course, be effectively used for addition to pulp prepared from any types of cellulosic fibers, synthetic fibers, or combinations. Among the cellulosic materials which may be used are bleached and unbleached sulfate (kraft), bleached and unbleached sulfite, bleached and unbleached soda, neutral sulfite, semi-chemical, chemiground wood, ground wood or any combination of these fibers. Fibers of the viscose rayon or regenerated cellulose type may also be used if desired.

Any desired inert mineral fillers may be added to the pulp which is to be modified with our novel starch derivatives. Such materials include clay, titanium dioxide, talc, calcium carbonate, calcium sulfate and diatomaceous earths. Rosin may also be present, if desired.

With respect to the proportion of the starch derivative to be incorporated with the paper pulp, we have found that this may vary in accordance with the particular pulp involved. In general, we prefer to use about 0.05% to 1.0% of the starch derivative, based on the dry weight of the pulp. Within this preferred range the precise amount which is used will depend upon the type of pulp being used, the specific operating conditions, and the particular end use for which the paper is intended. The use of amounts of starch derivative greater than 1%, on the dry weight of the pulp, is not precluded, but is ordinarily unnecessary in order to achieve the desired improvements. When added in the proper concentrations, our starch derivatives serve to increase pigment retention and paper strength, while providing the finished sheet with improved resistance to folding, picking and scuffing.

The starch derivatives employed in our process contain anionic (phosphate) groups and cationic groups in carefully balanced ratios, yielding a combination of charges which come into play alternatively under varying conditions of application, such as pH, alum concentration (if any) or water hardness. Further, and surprisingly, the products of our invention by the interaction of anionic and cationic groups not only give a well balanced performance over a wide range of pH, water hardness, alum concentration and other variables, but yield performance maxima in terms of pigment retention and paper strength not heretofore obtainable with starch products containing either cationic or anionic groups alone. This surprising synergistic effect makes our additives significantly superior to prior art products within the wide range of operating conditions existing in the papermaking art.

The following examples will further illustrate the embodiment of this invention. Unless otherwise stated, all parts are by weight.

EXAMPLE I

This example illustrates the preparation of typical aminephosphate starch derivatives suitable for use in the process of this invention.

Part A

The following ingredients were charged into a reaction vessel fitted with means for mechanical agitation:

| | Parts |
|---|---|
| Corn starch | 100 |
| Water | 125 |
| Diethylamino ethyl chloride hydrochloride | 3 |
| Calcium hydroxide | 6 |

Under agitation, the latter mixture was allowed to react at room temperature for 16 hours. After the reaction was completed, the pH level of the system was adjusted to 3 by the addition of hydrochloric acid. The resulting product was then filtered, washed and dried. It was found to have a nitrogen content of 0.25%, by weight, corresponding to a D.S. (for the cationic group) of 0.030.

In order to phosphorylate the above prepared diethylamino ethyl ether of corn starch, the following ingredients were charged into a reaction vessel fitted with means for mechanical agitation:

| | Parts |
|---|---|
| Diethylamino ethyl ether of corn starch (as prepared hereinabove) | 100 |
| Water | 125 |
| Dihydrogen monosodium phosphate monohydrate | 4 |

The above ingredients were completely dispersed and the pH level of the system was adjusted to 6 by the addition of concentrated ammonium hydroxide or sodium hydroxide. The mixture was then allowed to agitate at room temperature for a period of one hour. The resulting starch product was filtered, dried to a moisture content of less than 10%, by weight, and then heat reacted, for three hours, in a forced air oven set at 130° C. The resulting product was cooled, washed and dried. It was found to have a phosphorous content of 0.067%, by weight. The molar ratio of anionic to cationic groups was thus 0.120.

Part B

A derivative similar to that prepared in part A, hereinabove, was prepared by the same procedures, with the exception that the impregnation and ultimate reaction was run at a pH level of 4 and the order of treatment was inverted, i.e. phosphorylation was conducted prior to diethylamino ethylation of the starch molecule. The resulting product showed comparable concentrations of nitrogen and phosphorous as compared with the previously prepared starch product of part A.

In neither case did the resulting product show any indication of being inhibited. This was determined by cooking a 0.1%, by weight, aqueous suspension of the resulting starch products in a boiling water bath for a period of 15 minutes. The cooked dispersion was then allowed to stand, at room temperature, in a 100 ml. graduate cylinder for a period of approximately 16 hours. At the end of this period, no separation or sedimentation was evident.

EXAMPLE II

This example illustrates the use of the previously prepared starch products of Example I, parts A and B, as additives to paper stock and also demonstrates the improved pigment retention resulting from their addition to paper-making pulp. It further illustrates the increased pigment retention effected by these starch additives when compared with the results obtained by the use of a starch phosphate and a diethylamino ethyl ether of starch.

The four starch additives described in the following table were added to bleached sulfite pulp at concentrations of 0.2%, based on the weight of the dry pulp. The pigment retention values were determined at pH levels of 4.6, 6.0 and 7.6; the systems being acidified to the lower two levels by the addition of alum. The paper sheets were then prepared on the Williams Standard Sheet Mold and were tested for titanium dioxide pigment retention by the method described in TAPPI Standard #T413m.58.

The results of these pigment retention determinations are presented in the following table.

| Starch Additive | D.S. cationic group [1] | (A/C) | Percent TiO$_2$ retention at pH 4.6 | 6.0 | 7.6 |
|---|---|---|---|---|---|
| Additive No.: | | | | | |
| 1 — Phosphorylated diethylamino ethyl ether of starch (as prepared in Ex. I, Part A). | 0.030 | 0.120 | 68.8 | 80.6 | 66.8 |
| 2 — Diethylamino ethylated starch phosphate (as prepared in Example I, Part B). | 0.046 | 0.070 | 69.0 | 82.0 | 69.0 |
| 3 — Diethylamino ethyl ether of starch (prepared by the procedure described in Ex. I of U.S. Patent No. 2,813,093). | 0.030 | | 50.0 | 55.0 | 70.0 |
| 4 — Starch phosphate (prepared by the procedure described in Ex. I of U.S. Patent No. 2,884,412) containing 0.1% by weight, of phosphorous. | | | 60.9 | 63.0 | 32.3 |

[1] The concentration of residual natural protein nitrogen which may be present in our cereal starch derivatives and which may amount to about 0.03–0.05% of nitrogen is neglected in calculating these D.S. values.

The data summarized hereinabove clearly indicates the improved pigment retention obtained by the use of the novel products of this invention. It further indicates the equivalent performances which are obtained regardless of whether the cationic amino group has been introduced before or after the introduction of the anionic phosphate group.

EXAMPLE III

This example further illustrates the increased pigment retention effectiveness of the starch derivatives of this invention when compared with the results obtained by the individual use, respectively, of a starch phosphate and a diethylamino ethyl ether of starch as well as the combined use of the latter two starch derivatives.

The starch additives described in the following table were each, in turn, admixed with bleached sulfite pulp at concentrations of 0.2%, based on the weight of the dry pulp. The pigment retention values of the respective derivatives were determined according to the procedure set forth in Example II, hereinabove, and the results of these determinations are presented in the following table.

| Starch Additive | D.S. cationic group | (A/C) | Percent TiO$_2$ retention at pH 4.6 | 6.0 | 7.6 |
|---|---|---|---|---|---|
| Additive No. | | | | | |
| 1 — Phosphorylated diethylamino ethyl ether of corn starch (prepared by procedure set forth in Example 1A). | 0.045 | 0.129 | 71 | 84 | 66 |
| 2 — Diethylamino ethyl ether of corn starch (prepared by procedure described in Example I of U.S. Patent No. 2,813,093). | 0.045 | | 46 | 54 | 70 |
| 3 — Corn starch phosphate (prepared by procedure described in Example I of U.S. Patent No. 2,884,412) containing 0.24%, by weight, of phosphorous. | | | 65 | 73 | 24 |
| 4 — 1:1 physical mixture of additives #3 and #2. | | | 54 | 58 | 32 |
| 5 — 1:2 physical mixture of additives #3 and #2. | | | 57 | 59 | 25 |
| 6 — 1:3 physical mixture of additives #3 and #2. | | | 60 | 63 | 29 |

The data summarized hereinabove clearly indicates the superior pigment retention achieved over a wide range of pH conditions, upon utilizing the starch additives of this invention as contrasted with either cationic or phosphate phorylated quaternary amine corn starches were then submitted to the pigment retention test described in Example II, hereinabove. The results of these determinations are presented in the following table.

| Starch Additive | D.S. cationic group | (A/C) | Percent TiO$_2$ retention at pH | | |
|---|---|---|---|---|---|
| | | | 4.6 | 6.0 | 7 |
| Additive No. | | | | | |
| 1 ........ Phosphorylated quaternary amine corn starch .... | 0.039 | 0.155 | 67 | 75 | 59 |
| 2 ........ Quaternary amine corn starch ................ | 0.039 | ........ | 50 | 55 | 70 | starch derivatives as well as with physical mixtures of the two.

EXAMPLE IV

This example illustrates the use in the paper making process of various starch additives typical of this invention containing cationic groups other than a diethylamino ethyl group and demonstrates the improved pigment retention resulting from their addition to pulp.

Part A

The derivatives utilized in this example were prepared by means of the procedure set forth in Example IA with the exception that the corn starch was first treated with di-isopropylaminoethyl chloride hydrochloride in order to affix the cationic di-isopropylamino ethyl group and the resulting cationic derivative thereupon treated with the dihydrogen monosodium phosphate.

The pigment retention ability of the resulting starch derivatives as well as of non-phosphorylated di-isopropylamino ethyl ethers of starch, as prepared by means of the procedure set forth in U.S. Patent No. 2,813,903, was then evaluated by means of test described in Example II, hereinabove. The results of these determinations are presented in the following table.

Part C

The identical procedure described in Example IA, hereinabove, was utilized to prepare the various derivatives utilized in this example with the exception that the di-ethylamino ethyl ether of corn starch was reacted with ethylene imine in an inert solvent prior to the phosphorylation thereof. The pigment retention ability of the resulting primary-tertiary amine corn starch phosphates, as well as of the comparable non-phosphorylated derivative, were then evaluated by means of the pigment retention test described in Example II, hereinabove. Results of these evaluations are presented in the following table.

| Starch Additive | D.S. cationic group | (A/C) | Percent TiO$_2$ retention at pH | | |
|---|---|---|---|---|---|
| | | | 4.6 | 6.0 | 7.6 |
| Additive No.: | | | | | |
| 1 ........ Phosphorylated primary-tertiary amine corn starch ... | 1.45 | 0.015 | 60 | 70 | 73 |
| 2 ........ do ................................................... | 1.45 | 0.078 | 65 | 73 | 73 |
| 3 ........ do ................................................... | 1.45 | 0.187 | 66 | 69 | 72 |
| 4 ........ do ................................................... | 1.45 | 0.311 | 62 | 70 | 72 |
| 5 ........ Primary-tertiary amine corn starch ................... | 1.45 | ........ | 57 | 66 | 70 |

The data summarized in the three examples above clearly indicates the improved pigment retention obtained by the use of the starch additives of this invention regardless of the cationic moiety present therein.

EXAMPLE V

This example illustrates the improved pigment retention obtained in pulp systems containing various starch additives typical of this invention which have been prepared from a number of different starch bases; the resulting derivatives containing varying concentrations of nitrogen and phosphorous.

| Starch Additive | D.S. cationic group | (A/C) | Percent TiO$_2$ retention at pH | | |
|---|---|---|---|---|---|
| | | | 4.6 | 6.0 | 7.6 |
| Additive No. | | | | | |
| 1 ........ Phosphorylated di-isopropylamino ethyl ether of corn starch. | 0.025 | 0.105 | 59 | 68 | 65 |
| 2 ........ do ................................................... | 0.047 | 0.100 | 63 | 72 | 70 |
| 3 ........ do ................................................... | 0.056 | 0.360 | 66 | 80 | 72 |
| 4 ........ Di-isopropylamino ethyl ether of corn starch ......... | 0.025 | ........ | 49 | 55 | 67 |
| 5 ........ do ................................................... | 0.047 | ........ | 50 | 56 | 62 |
| 6 ........ do ................................................... | 0.056 | ........ | 49 | 57 | 70 |

Part B

For the purposes of this example, corn starch was reacted with the reaction product of triethylamine and epichlorhydrin according to the procedure set forth in Example I of U.S. Patent No. 2,876,217. A portion of the resulting quaternary amine corn starch was then phosphorylated according to the procedure of Example IA, hereinabove. Both the phosphorylated and non-phosphorylated All of the additives described in the following table were prepared and tested by means of the procedures set forth in Examples IA and II, hereinabove. For each of the additives tested, this table indicates the starch base which was used, the D.S. of the cationic group, and the molar ratio of anionic to cationic groups in the resulting derivatives, and the pigment retention values obtained through their use.

| Starch base | D.S. cationic group | (A/C) | Percent $TiO_2$ retention at pH | | |
|---|---|---|---|---|---|
| | | | 4.6 | 6.0 | 7.6 |
| Additive No.: | | | | | |
| 1 [1] ... Corn starch | | | 65 | 73 | 24 |
| 2 ... do | 0.033 | 0.024 | 62 | 74 | 64 |
| 3 ... do | 0.033 | 0.092 | 63 | 73 | 63 |
| 4 ... do | 0.033 | 0.123 | 64 | 74 | 64 |
| 5 [2] ... do | 0.033 | ------ | 53 | 58 | 58 |
| 6 ... do | 0.045 | 0.70 | 77 | 80 | 46 |
| 7 ... do | 0.045 | 1.59 | 75 | 74 | 37 |
| 8 ... do | 0.045 | 4.45 | 72 | 72 | 33 |
| 9 ... do | 0.046 | 0.078 | 68 | 79 | 60 |
| 10 ... do | 0.055 | 0.098 | 62 | 76 | 69 |
| 11 ... do | 0.055 | 0.111 | 69 | 80 | 67 |
| 12 ... do | 0.055 | 0.121 | 70 | 79 | 67 |
| 13 [2] ... do | 0.055 | ------ | 54 | 57 | 67 |
| 14 [3] ... do | 0.051 | 0.107 | 72 | 77 | 64 |
| 15 [3] ... do | 0.051 | 0.151 | 75 | 80 | 70 |
| 16 [3] ... do | 0.051 | 0.075 | 70 | 76 | 66 |
| 17 [3] ... do | 0.052 | 0.086 | 62 | 77 | 69 |
| 18 [3] ... do | 0.048 | 0.133 | 65 | 78 | 68 |
| 19 ... Waxy maize | 0.031 | 0.174 | 67 | 77 | 69 |
| 20 [2] ... do | 0.031 | ------ | 54 | 61 | 76 |
| 21 ... Tapioca | 0.030 | 0.127 | 70 | 80 | 69 |
| 22 [2] ... do | 0.030 | ------ | 56 | 69 | 71 |

[1] Additive #3 of Example III.
[2] These derivatives were not phosphorylated, and contained only the cationic group.
[3] These derivatives were phosphorylated prior to being amino ethylated, as per the procedure set forth in Example IB.

The data appearing in the above table clearly indicates the excellent pigment retention performance of the starch derivatives of this invention when prepared from varying starch bases under a wide variety of reaction conditions. It further indicates the superiority of the starch derivatives of this invention over comparable diethylamino ethylated starches, as illustrated by additive numbers 5, 13, 20 and 22.

EXAMPLE VI

Potato starch contains naturally occurring phosphorous which permits it to show improved properties when utilized as a paper additive. Despite this improved showing, the results presented in the following table clearly indicate still further improvement when even potato starch is subjected to the derivatization process wherein cationic and phosphate groups are chemically introduced, and then utilized as a paper additive. The respective starch additives were prepared and tested according to the procedures set forth in Examples IA and II, hereinabove.

The data presented hereinabove clearly indicates the utility of the starch additives of this invention regardless of the type of water which is available for the paper manufacturing process.

EXAMPLE VIII

This example illustrates the improved burst strength which is obtained with the use of our novel additives as compared with the strength of untreated sheets as well as with sheets treated with a conventional, diethylamino ethyl ether of starch.

Four phosphorylated cationic starches were prepared according to the general procedure of Example IA, hereinabove. Thus, corn starch was first treated with 4%, by weight, of diethylamino ethyl chloride hydrochloride to affix the cationic diethylamino ethyl group and thereupon samples of the latter product were treated, respectively, with 4%, 5% and 6%, by weight, of dihydrogen monosodium phosphate. The phosphorylation reactions were carried out at a pH level of 6.0, a temperature of 130° C. and a reaction period of 3½ hours.

With agitation, the above prepared starch additives were added, at the headbox, to an unbleached kraft pulp in concentrations of 1%, as based upon the dry weight of the pulp. Various sample sheets were prepared with the pulp stock at its regular unadjusted pH level of 7.6 as well as at the respective pH levels of 4.6 and 6.0; the latter levels having been attained as a result of the addition of alum to the stock. Sheets were then prepared from each of the latter pulp stocks on a Williams standard sheet mold.

The strength of these sheets was determined using the Mullen tester according to procedures set forth in TAPPI Standards T403, ts–63. In this apparatus a sheet of paper is clamped between two ring shaped platens, thus leaving an exposed circular surface of paper under which there is an inflatable rubber diaphragm. As air is pumped into this diaphragm it expands and comes into contact with the exposed surface of the paper. Note is made of the pressure, in p.s.i., at which the diaphragm caused the paper to burst. The Mullen factor is then calculated by dividing the latter figure by the basis weight of the paper; a higher Mullen factor thus indicating a stronger paper.

| Starch Additive | D.S. cationic group | (A/C) | Percent $TiO_2$ retention at pH | | |
|---|---|---|---|---|---|
| | | | 4.6 | 6.0 | 7.6 |
| Additive No.: | | | | | |
| 1 ... Phosphorylated diethylamino ethyl ether of potato starch. | 0.031 | 0.550 | 70.0 | 78.1 | 62.0 |
| 2 ... Diethylamino ethyl ether of potato starch | 0.031 | ------ | 62.3 | 73.1 | 70.0 |
| 3 ... Potato starch containing 0.09% of naturally occurring phosphorous. | ------ | ------ | 55 | 61 | 41 |

EXAMPLE VII

This example illustrates the greater versatility of the starch additives of this invention when compared with a diethylamino ethylated starch derivative.

For purposes of this example, a phosphorylated diethylamino ethyl ether of potato starch was prepared and tested by means of the procedures set forth in Examples IA and II, hereinabove. The pigment retention tests were carried out in both hard and distilled water. The results obtained are presented in the following table:

Using the same paper making procedure as described above, comparable sheets were prepared which in this case were, however, treated with a conventional diethylamino ethyl ether of starch. The following table presents the results of these tests.

| Size Additive | D.S. cationic group | (A/C) | Mullen factor at pH | | |
|---|---|---|---|---|---|
| | | | 4.6 | 6.0 | 7.6 |
| Additive No.: | | | | | |
| 1 ... Phosphorylated diethylamino ethyl ether of starch | 0.045 | 0.146 | 1.40 | 1.50 | 1.59 |
| 2 ... do | 0.045 | 0.155 | 1.46 | 1.50 | 1.57 |
| 3 ... do | 0.045 | 0.160 | 1.46 | 1.51 | 1.49 |
| 4 ... Diethylamino ethyl ether of starch | 0.045 | ------ | 1.38 | 1.48 | 1.44 |

The above data clearly shows the improved bursting strength of the sheets treated with our paper additives.

| Starch Additive | D.S. cationic group | (A/C) | pH of the system | Water | Percent $TiO_2$ retention at pH 6.0 |
|---|---|---|---|---|---|
| Additive No.: | | | | | |
| 1 ... Phosphorylated diethylamino ethyl ether of potato starch | 0.035 | 0.452 | 5.95 | Dist | 77.0 |
| 2 ... Diethylamino ethyl ether of potato starch | 0.030 | ------ | 5.45 | Dist | 71.0 |
| 3 ... Phosphorylated diethylamino ethyl ether of potato starch | 0.035 | 0.452 | 7.35 | Hard | 76.4 |
| 4 ... Diethylamino ethyl ether of potato starch | 0.030 | ------ | 7.85 | do | 58.5 |

EXAMPLE IX

This example illustrates the use, in the process of our invention, a cationic starches which had been phosphorylated with a variety of reagents introducing ortho-phosphate mono-ester groups into the starch. In each of the following variations, the diethylaminoethyl ether of corn starch, prepared as in part A of Example I hereinabove, was phosphorylated with the indicated reagent, and the resulting product was subsequently incorporated in paper pulp containing titanium dioxide, and tested for pigment retention effectiveness.

| | Phosphorylating Agent | D.S. cationic group | (A/C) | Percent $TiO_2$ retention at pH 4.6 | 6.0 | 7.6 |
|---|---|---|---|---|---|---|
| Additive No.: | | | | | | |
| 1 | $Na_4P_2O_7 \cdot 10 H_2O$ | 0.045 | 0.25 | 65 | 79 | 54 |
| 2 | Polyphosphoric acid | 0.045 | 0.45 | 70 | 82 | 49 |
| 3 | Phosphoric acid and urea | 0.045 | 0.14 | 60 | 75 | 58 |
| 4 | Phosphoric acid (86%) | 0.045 | 0.15 | 62 | 79 | 67 |
| 5 | Sodium hexametaphosphate | 0.045 | 0.44 | 65 | 78 | 46 |
| 6 | Potassium tripolyphosphate | 0.045 | 0.12 | 60 | 77 | 72 |
| 7 | Mixture of monosodium dihydrogen phosphate monohydrate and sodium tripolyphosphate. | 0.045 | 0.14 | 72 | 80 | 66 |
| 8 | None | 0.045 | | 50 | 55 | 67 |

Notes.—Additives 1, 2, 3, 4, 5 and 7 were made by suspending 100 parts of the diethylaminoethyl ether of starch in 125 parts water containing the required amount of reagent, agitating at pH 6 for one hour or more, filtering, drying to about 10% moisture and then heat reacting at 125° C. for 3 hours. In preparing additive #3 we used 2.89% phosphoric acid and 7.4% urea, based on the starch weight. In making additive #7, we employed 4% of the monosodium dihydrogen phosphate and 0.4% sodium tripolyphosphate, based on the starch weight. Additive #6 was prepared by suspending the cationic starch in water containing the reagent, adjusting pH to 4, agitating one hour, filtering and drying in a hot air dryer at 220° F. to a moisture content of 3%.

Although it will be noted that in some cases the starch derivative containing both cationic and phosphate substituents is not significantly more effective than a starch derivative with only cationic groups, when used under essentially neutral pH conditions, the important fact is that the cationic-anionic derivative is effective as a pigment retention and strength additive at neutral as well as acidic pH conditions. By contrast, note that those starch derivatives containing only phosphate groups are vastly less effective under non-acidic conditions.

Summarizing, our invention is thus seen to provide the practitioner with novel paper additives which are operable under a wide variety of conditions and are capable of providing paper products which are characterized by their excellent pigment retention as well as increased strength.

1. A paper containing homogeneously dispersed therein a starch derivative containing chemically introduced cationic groups and anionic phosphate groups wherein the ratio of anionic groups to cationic groups in said starch derivative is within the range of from about 0.01 to 4.5 moles of anionic groups per mole of cationic group and the degree of substitution of said cationic groups in said starch derivatives range from about 0.005 to 1.5 and wherein said anionic and cationic groups are both substituted upon the same starch molecule of said derivative.

2. The paper of claim 1, wherein said cationic groups are selected from the group consisting of primary amine, secondary amine, tertiary amine, quaternary amine, sulfonium and phosphonium groups.

3. The paper of claim 1 wherein the chemically introduced cationic groups comprise diethyl amino ethyl groups wherein the ratio of phosphate groups to diethyl amino ethyl groups in said starch derivative is within the range of from about 0.01 to 4.5 moles of phosphate groups per mole of diethyl amino ethyl group.

4. In a method for making paper, the step which comprises adding to the stock, at any stage prior to passing the stock onto the wire, a starch derivative containing chemically introduced cationic groups and anionic phosphate groups wherein the ratio of anionic groups to cationic groups in said starch derivative is within the range of from about 0.01 to 4.5 moles of anionic groups per mole of cationic group and the degree of substitution of said cationic groups in said starch derivatives range from about 0.005 to 1.5 and wherein said anionic and cationic groups are both substituted upon the same starch molecule of said derivative.

5. The method of claim 4, wherein said cationic groups are selected from the group consisting of primary amine, secondary amine, tertiary amine, quaternary amine, sulfonium and phosphonium groups.

6. The method of claim 4 wherein the chemically introduced cationic groups comprise diethyl amino ethyl groups wherein the ratio of phosphate groups to diethyl amino ethyl groups in said starch derivative is within the range of from about 0.01 to 4.5 moles of phosphate groups per mole of diethyl amino ethyl group.

7. A starch derivative containing chemically introduced cationic groups and anionic phosphate groups wherein the ratio of anionic groups to cationic groups is within the range of from about 0.01 to 4.5 moles of anionic groups per mole of cationic group and the degree of substitution of said cationic groups in said starch derivatives range from about 0.005 to 1.5 and wherein said anionic and cationic groups are both substituted upon the same starch molecule of said derivative.

8. The starch derivative of claim 7 wherein said cationic groups are selected from the group consisting of primary amine, secondary amine, tertiary amine, quaternary amine, sulfonium and phosphonium groups.

9. The starch derivative of claim 7 wherein the chemically introduced cationic groups comprise diethyl amino ethyl groups.

References Cited

UNITED STATES PATENTS

| 2,813,093 | 11/1957 | Caldwell et al. | 260—233.3 |
| 2,884,412 | 4/1959 | Neukom | 260—233.5 |
| 2,989,520 | 6/1961 | Ruttenberg et al. | 260—233.3 |
| 3,077,469 | 2/1963 | Aszlos | 260—233.3 |
| 3,352,848 | 11/1967 | Christoffel et al. | 260—233.3 X |

S. LEON BASHORE, Primary Examiner

T. G. FERRIS, Assistant Examiner

U.S. Cl. X.R.

127—32, 33; 162—199, 253; 260—233